United States Patent

Thomason et al.

[11] Patent Number: 6,018,612
[45] Date of Patent: Jan. 25, 2000

[54] ARRANGEMENT FOR STORING AN INFORMATION SIGNAL IN A MEMORY AND FOR RETRIEVING THE INFORMATION SIGNAL FROM SAID MEMORY

[75] Inventors: Graham G. Thomason; Paul M. Van Loon, both of Eindhoven, Netherlands

[73] Assignee: U.S. Philips Corporation, New York, N.Y.

[21] Appl. No.: 08/768,740

[22] Filed: Dec. 17, 1996

Related U.S. Application Data

[63] Continuation of application No. 08/368,576, Jan. 4, 1995, abandoned, which is a continuation of application No. 08/136,794, Oct. 14, 1993, abandoned.

[30] Foreign Application Priority Data

Oct. 19, 1992 [EP] European Pat. Off. ............... 92203191

[51] Int. Cl.[7] .................................................. H04N 5/783
[52] U.S. Cl. .............................................. 386/82; 386/125
[58] Field of Search .................................. 386/46, 125, 82, 386/77, 68, 124, 109, 112, 91, 92, 126

[56] References Cited

U.S. PATENT DOCUMENTS

| | | | |
|---|---|---|---|
| 4,361,849 | 11/1982 | Bolger | 358/312 |
| 4,409,670 | 10/1983 | Herndon et al. | 360/5 |
| 4,963,995 | 10/1990 | Lang | 358/335 |
| 5,134,499 | 7/1992 | Sata et al. | 358/342 |
| 5,194,963 | 3/1993 | Dunlap et al. | 360/15 |
| 5,241,428 | 8/1993 | Goldwasser et al. | 386/109 |
| 5,253,244 | 10/1993 | Bailey | 358/342 |

*Primary Examiner*—Huy Nguyen
*Attorney, Agent, or Firm*—Edward W. Gordon

[57] ABSTRACT

An arrangement for storing an information signal in a main memory (36) and retrieving the information signal from said main memory includes the memory (36), an input buffer memory (35a) and an output buffer memory (35b). The input buffer memory and the output buffer memory are combined into one single buffer memory (35).

16 Claims, 2 Drawing Sheets

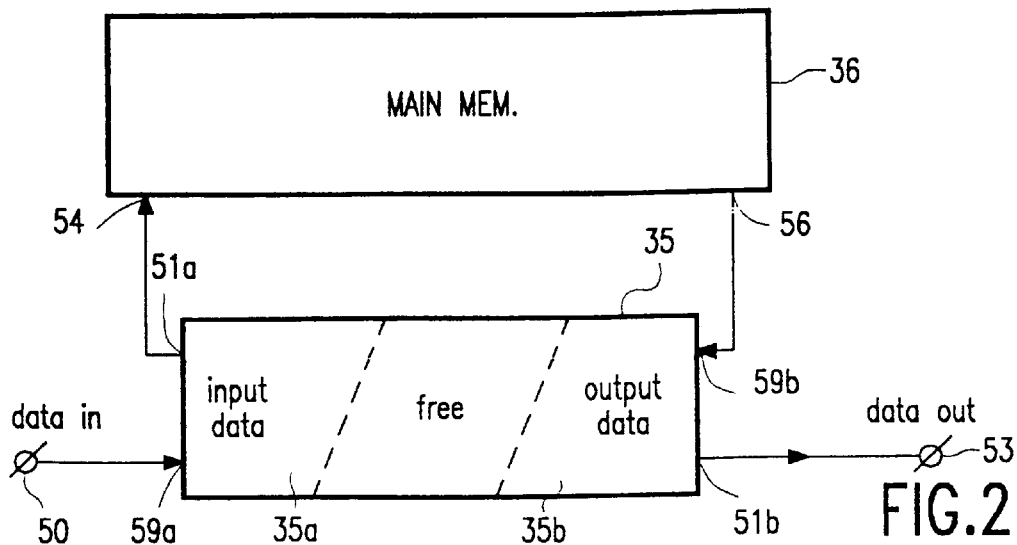
FIG. 2
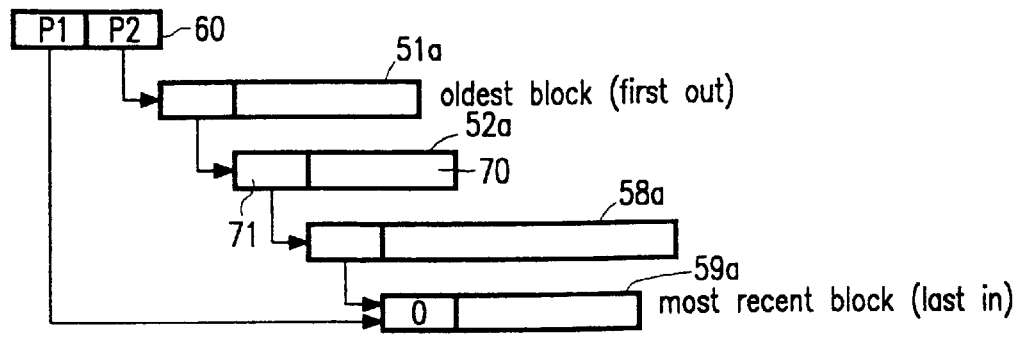
FIG. 3a
FIG. 3b
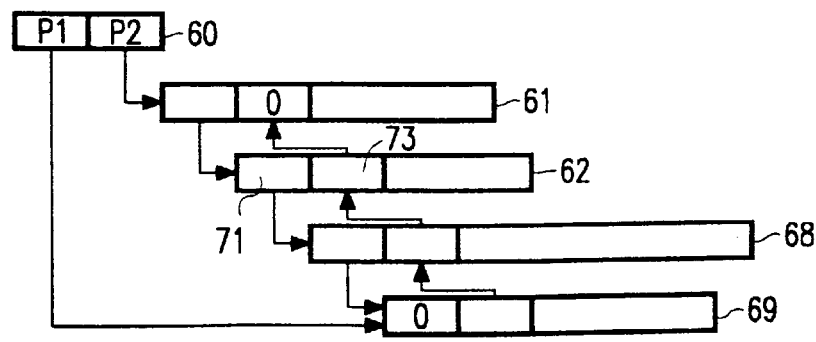
FIG. 4

ARRANGEMENT FOR STORING AN INFORMATION SIGNAL IN A MEMORY AND FOR RETRIEVING THE INFORMATION SIGNAL FROM SAID MEMORY

This is a division of application Ser. No. 08/368,576, filed Jan. 4, 1995, abandoned, which is a continuation of application Ser. No. 08/136,794 filed Oct. 14, 1993, abandoned.

BACKGROUND OF THE INVENTION

1. Field of the Invention

The invention relates to an arrangement for storing an information signal in a memory and retrieving the information signal from said memory, the arrangement including the memory, an input terminal for receiving the information signal, an output terminal for supplying a delayed version of the information signal, an input buffer memory, having an input coupled to the input terminal and an output coupled to an input of said memory, and an output buffer memory having an input coupled to the output of said memory and an output coupled to said output terminal.

2. Description of the Related Art

Published international patent application no. WO91/13695 discloses the temporary storage of a video signal in a memory. Using this known arrangement, an information signal can be stored in the memory and an information signal previously stored in said memory can be retrieved simultaneously from said memory. The memory can be in the form of an optical disk or a magnetic disk, such as a hard disk or a disk-array. The arrangement can be used in a television apparatus or a videorecorder so as to store a video signal in the memory.

One application of the arrangement is where live television signal transmissions are continuously recorded and a history is maintained as far back as the extent of the memory will permit. For some applications, the memory capacity of the memory can be such that it permits the storage of a video signal having a length of a few minutes. For other applications a memory capacity corresponding to a length of about 15 minutes is considered a minimum practical amount.

The arrangement offers a number of interesting features to a user.

Individual choice of the time at which a program is watched. For example, suppose at ten past eight the viewer wants to start watching the eight o'clock news (from the beginning, of course). Using the arrangement, provided the right channel has been monitored, the viewer jumps back ten minutes in time, as it were, and watches the news from the start. Unlike the case where the program is recorded on a conventional video recorder, the viewer does not have to wait until the program has finished before watching it.

Continuity after an interruption. If the viewer is interrupted while watching a program, for example by a telephone call or a call at the door, he can resume watching the program from the point at which he was interrupted. This functionality is not possible with a conventional video-recorder.

A practical solution to program overlap. Suppose a program on one channel doesn't finish until ten minutes after the start of a program on another channel. The invention permits one to watch both programs without the use of a video recorder. During the first program, the viewer ensures that the channel of the second program is being monitored. After the first program has ended, the viewer switches to the other channel and jumps back to the start of the program. An important advantage over using a video recorder is that one does not have to wait until the recording has finished before the program can be watched.

Individual replays, including slow motion. The viewer can see a replay of an event just seen, (or just missed, or not fully understood) and then continue watching the program from the point where the replay was started. Moreover, the replays can be watched in slow motion.

Belated decision to record on video recorder possible. A viewer may decide after watching a program for ten minutes that the program is worth recording onto video tape. With the arrangement, he can retrospectively start video-recording, while continuing to watch the program live.

Additional features of the arrangement are:

A means of accelerating the viewing of a historical program. If the viewer is not watching live, e.g. due to a later program start or an interruption, he can catch up with the live broadcast by accelerating the playback. An acceleration factor of a few per cent is practically unnoticed by the viewer. The circuitry (disk readout, demultiplexing, data decompression, d/a conversion etc.) must be capable of processing the data at the accelerated rate. The sound can be specially processed so that the speed is accelerated without an undue increase in tone.

A means of fast-accelerating over a historical program. In this case not all television picture data is necessarily processed—some may be skipped and not be passed on for demultiplexing and decompression.

A fast reverse function.

A picture-in-picture (PIP) processing unit to enable combinations of live and historical programs to be displayed using picture-in-picture formats.

In order to enable an uninterrupted storage of a live television program in the main memory, and enable an uninterrupted and simultaneous retrieval of the historical program from the main memory, an input buffer memory and an output buffer memory are present. Data arriving for storage in the main memory, while the main memory is temporarily busy for another operation, will be stored in the input buffer memory, and will be stored at a later moment in the main memory by retrieving the data from the input buffer memory. Data will also be requested regularly from the main memory to be displayed on a TV screen as a historical program. Again, the main memory may be temporarily busy for another operation, so data must be readily available in the output buffer memory, so as to provide continuity of viewing for the user.

SUMMARY OF THE INVENTION

The invention provides for an improvement in relation to the memories included in the arrangement. For that purpose, the arrangement is characterized in that the input buffer memory and the output buffer memory are combined into one single buffer memory.

The invention is based on the following recognition. In an ideal operation of the input buffer memory, the control of the data transfer through the input buffer memory should be such that, in order to absorb a maximum amount of data without a transfer of data from the input buffer memory to the main memory, the input buffer memory should be empty. Further, in an ideal operation of the output buffer memory, the control of the data transfer through the output buffer memory should be such that, in order to provide a maximum amount of data to be displayed on the screen without a transfer of data from the main memory to the output buffer memory, the output buffer memory should be full. These requirements offer the possibility to combine the input buffer memory and the output buffer memory into one shared memory, to be used as efficiently as possible under the administration realized by a microprocessor.

The invention is specifically useful in the situation where the main memory is a hard-disk arrangement, and where the hard-disk arrangement has a single magnetic head for storing the information signal on and retrieving the information signal from the hard disk included in the hard-disk arrangement. It should however be noted that also in disk arrangements having more than one head, situations can occur where an uninterrupted storage on or retrieval from the disk is not possible, such as in the case where a head has to jump to another storage location and information flow interruption can not be corrected by another head. Further, it should be noted that, where the description discloses the storage of a single information signal in and retrieval of said information signal from the main memory, it is equally well possible to apply the inventive concept to the storage and retrieval of a number of two or more information signals in/from the main memory, eg. derived from different program channels.

BRIEF DESCRIPTION OF THE DRAWINGS

The invention will be further described in the following figure description, in which FIG. 1 discloses an embodiment of the arrangement;

FIG. 2 discloses a more simplified embodiment;

FIG. 3 discloses a buffer memory in the form of a FIFO; and

FIG. 4 discloses a buffer memory in the form of a reversible FIFO.

DESCRIPTION OF THE PREFERRED EMBODIMENT

Figure 1:
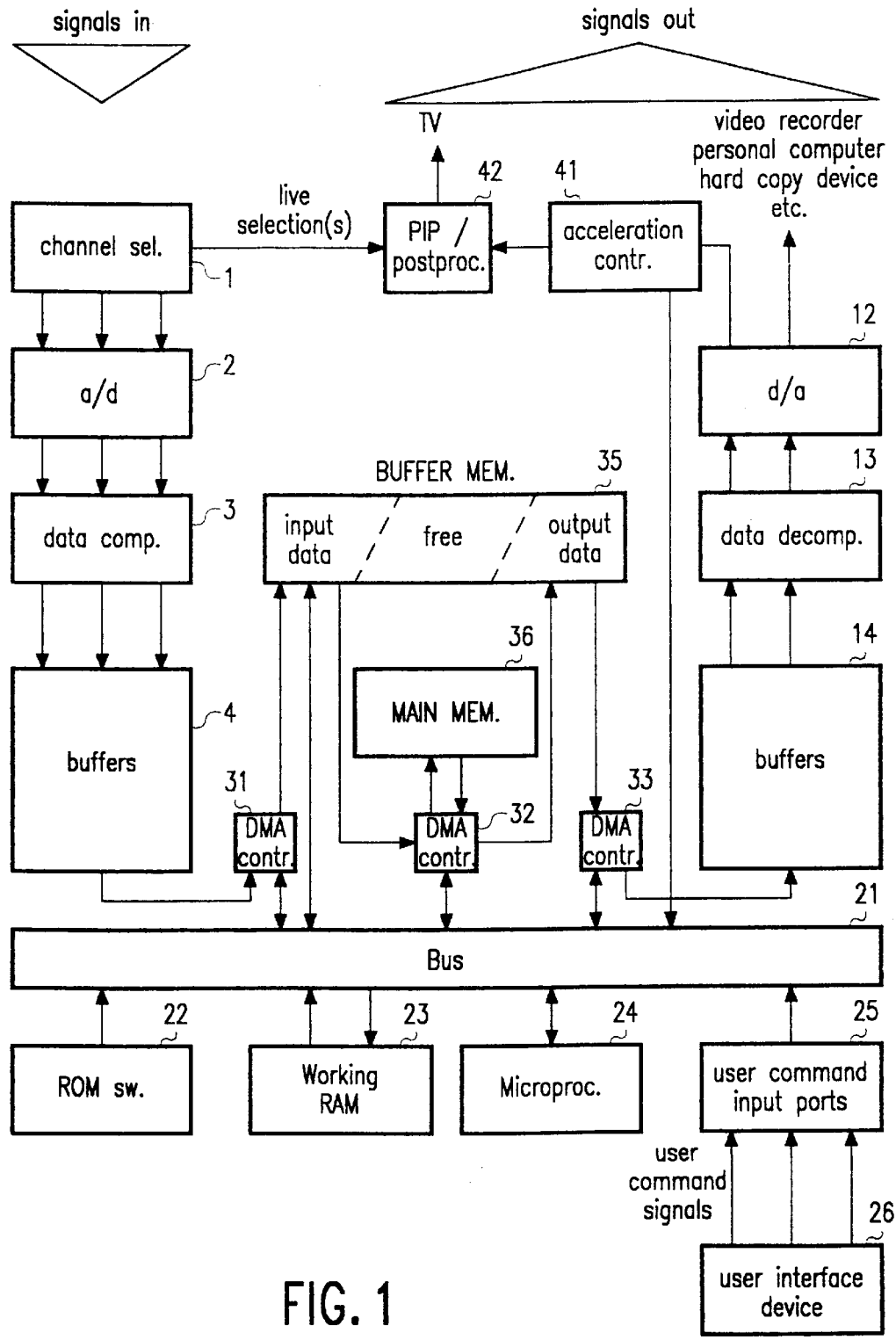

FIG. 1 discloses an embodiment of the arrangement. One or more television signals first pass through a channel selector 1, which selects which transmissions, according to their channel, are to be stored, and which transmissions, according to their channel, are required for live display. The transmissions which are selected to be stored are digitized by means of a/d (analog to digital) converters 2. The digital data is then compressed in real time by a data compressor 3. The output of each channel after being compressed by the data compressor 3 is placed in a buffer 4, of which there is at least one per selected channel. The buffers 4 also act as a multiplexer because they can be read out in such a way as to convert several parallel data streams into one data stream (although the different streams are separately administered). The information contained in the buffers 4 will be transferred to the buffer memory 35 under supervision of a microprocessor 24 by a DMA (direct memory access) controller 31, and is identifiable as input destined for a main memory 36, which is in the form of a band disk arrangement. The microprocessor 24 initiates the data transfer from the buffer 4 to the buffer memory 35, and performs memory allocation in the buffer memory. The microprocessor 24 runs ROM-(read-only memory) 22 based software and makes use of a working RAM (random access memory) 23 for temporary variables, the administration of the buffer memory 35, storage of user commands and the user status, etc. Input data in the buffer memory 35 is transferred to the main memory 36 as soon as it is convenient under supervision of the microprocessor 24 by another DMA controller 32.

The stored data in main memory 36 is in due course transferred to the buffer memory 35 under supervision of the microprocessor 24 by DMA controller 32. DMA controller 32 cannot at the same time be required or used for transferring data in the opposite direction. As television data is actually required to be displayed on the television screen, it is transferred under supervision of the microprocessor 24 by DMA controller 33 to a buffer 14. The process of transfer of data from main memory 36 to the buffer memory 35, and from the buffer memory 35 to the buffers 14 takes place separately for channels which the viewer has selected as historical channels to be viewed or recorded or used for any other purpose. An adequate supply of data per channel must always be present in the buffer memory 35 to be able to keep up with the demand. Data is taken from the buffers 14 and is decompressed by a data decompressor 13, and is converted to an analog signal by a d/a (digital to analog) converter 12. The output of the d/a converter 12 can be sent to a video recorder or television. An acceleration controller 41 has various tasks—it controls the acceleration rate at which data is required, including providing for slow motion and frozen frames and frame stepping. It also provides for fast forward and fast reverse functions. The DMA controller 33, buffers 14, data decompressor 13 and d/a (digital to analog) converters 12 should all be capable of working slightly faster (say 15%) than real time, so that an accelerated playback can be provided without loss of data until the acceleration controller 41 is reached which generates an accelerated display at a standard frame-rate. Live transmissions and historical transmissions can be simultaneously displayed using PIP=(picture-in-picture) techniques by a PIP/postprocessor 42.

It may be advantageous to combine the buffer memory 35 and working RAM (random access memory) 23 into one memory.

The buffer memory 35 enables a single-head hard-disk to cope with the dual task of writing the TV signal being monitored and simultaneously reading out the signal to be displayed.

Referring now to FIG. 2, conceptually, when the arrangement is in operation, there is a flow of data as follows.

Data arrives at the input terminal 50 for storage on the main memory 36, but as the disk in the main memory 36 may be temporarily busy for another operation, the data arriving will be buffered in input buffer 35a, by applying the data to the input 59a of said input buffer 35a. As soon as the disk is capable of receiving the data, the data stored in the input buffer 35a is supplied to the output 51a of the buffer 35a and applied to the input 54 of the main memory 36, for storage on the disk.

Data will also be regularly requested from the main memory disk 36 to be displayed on the TV screen. Again the disk may be temporarily busy for another operation. Data stored in the output buffer 35b is now supplied to the output 51b and thus applied to the output terminal 53 so as to enable continuity of viewing for the user. As soon as the disk is capable of supplying data, the data stored on the disk is supplied to the output 56 of the main memory 36 and applied to the input 59b of the output buffer memory 35b, for storage in the output buffer 35b.

In particular, the input buffer 35a is needed to buffer the incoming data while the disk is being read, and the output buffer 35b is needed to provide a continuous output of data while the disk is being written to. The input buffer 35a and the output buffer 35b are combined into one shared memory 35.

It will be shown that the input buffer part and the output buffer part in the buffer memory 35 can be realized using a FIFO or alternatively a reversible queue mechanism. These structures are now discussed.

FIG. 3 shows a buffer memory, such as the input buffer memory 35a in the form of a FIFO. The output buffer memory has the same construction. FIG. 3 shows basic FIFO queue control using a two-entry FIFO queue control block 60, including two pointer locations, the pointers stored in the locations pointing to the beginning and the end of the queue. The pointers in the control block 60 are set to some suitable constant such as zero to indicate an empty queue, see FIG. 3a. Memory blocks 51a, 52a, . . . , 58a and 59a are chained in one direction. All memory blocks include a memory space 70 for storing the data and a pointer location 71, as indicated in the memory block 52a. The pointer P1 in the control block 60 points to the address where the memory block 59a is stored. As this memory block is the block lastly stored, its pointer has a constant value, such as zero. The pointer P2 in the control block 60 points to the address where the memory block 51a is stored. This memory block is the block containing the oldest information stored in the buffer memory. Its pointer points to the address where the next memory block 52a is stored. The pointer 71 of the memory block 52a points to the address where the next memory block is stored. In this way, the pointer of block 58a points to the address where the block 59a is stored.

Memory blocks, such as the memory block 72, are added to the queue at the end of the chain. This is realized by setting P1 in control block 60 to the address where the memory block 72 is stored. Further, the pointer in memory block 72 becomes zero, and the pointer in memory block 59a will be set to the address where the memory block 72 is stored. Memory blocks, such as the memory block 51a, are taken from the queue at the start of the chain. This is realized by setting P2 in the control block 60 to the address where the memory block 52a is stored. In this way memory blocks can be added to and taken from the queue without the need to follow the whole chain of memory blocks. The pointer administration can be maintained in a short, fixed period of time.

A basic administration of the buffer memory 35 is possible using 3 FIFO queues, namely one FIFO queue (FIFO number 1) for the free memory blocks in the common buffer memory 35, one FIFO (FIFO number 2) for the input buffer memory part in the common buffer memory 35 and one FIFO (FIFO number 3) for the output buffer memory part of the common buffer memory 35.

A memory block is allocated for input by taking it from FIFO number 1 and adding it to FIFO number 2. A memory block is deallocated from input after its contents have been written to main memory 36 by taking it from FIFO number 2 and adding it to FIFO number 1. A memory block is allocated for output by taking it from FIFO number 1 and adding it to FIFO number 3. A memory block is deallocated from output after its data has been transferred to the output terminal 53 by taking it from FIFO number 3 and adding it to FIFO number 1. For this scheme to work properly, there must be adequate memory available in the buffer memory 35. It is important not to allow too much output memory to be allocated, as the amount of free memory for input will then be insufficient. The amount of memory needed, and the maximum amount of memory to ever be allocated to output data are mainly dependent on the seek time and data transfer time of the main memory 36.

The FIFO queue control blocks, such as the control block 60, can be located in fixed locations of working RAM 23 or the buffer memory 35.

Separate channels can be separately administered by defining one FIFO for free memory blocks and two FIFOs per channel (one for the input buffer part and one for the output buffer part, for each channel).

It may be possible to economies on memory by allowing the situation to occur exceptionally where there are no free memory blocks to allocate for input. In this case the most recently filled output buffer memory block is taken from FIFO number 3 and added to FIFO number 1. An indication is set that in due course this data must be re-read from main memory 36. This process can be repeated if more input buffer memory blocks are needed. A snag is that in order to deallocate the most recent buffer in a FIFO queue as administered in FIG. 3, the entire chain of memory blocks must be followed in order to find the most-recent-but-one memory block, which is to become the most recent memory block. This problem can be solved by using a reversible FIFO queue for the output buffer part, as illustrated in FIG. 4. Reversible queues are an extension to the FIFO of FIG. 3, in that the memory blocks are linked in both directions. This enables a consistent queue administration to be maintained for use as FIFO (First-In First-Out) or LIFO (Last-In First-Out) without needing to follow the whole chain of pointers. For that purpose, the memory blocks include two pointer locations 71 and 73, for pointing towards a subsequent and a previous memory block respectively. The memory block 61 can again be the block including the oldest information, and the block 69 then comprises the most information most recently stored.

If the reference numerals in FIG. 3 that carry an index 'a' are amended so as to carry an index 'b', the buffer memory of FIG. 3 thus obtained describes the output buffer memory 35b.

We claim:

1. An arrangement for intermediate storage of a video signal, said arrangement comprising:

input means for receiving sequential video signal elements at a first average speed;

first-in-first-out input bridging buffer memory means having an input fed by said input means, said input bridging buffer memory means having random access functionality for receiving said video signal elements and having an output interface;

mass memory disc means having cross-track random access functionality for effecting said intermediate storage, and having write head means fed by said output interface of said input bridging buffer memory means and furthermore read head means;

first-in-first-out output bridging buffer memory means having random access functionality and having an input interface fed by said read head means; and output means having an input fed by said read head means for outputting said sequential video signal elements at a second average speed, wherein said input bridging buffer memory means and said output bridging buffer memory means are exchangeably and coexistingly mapped on a single bridging buffer, for, through said random access functionality and said cross-track random access functionality, effecting an arbitrarily selectable intermediate storage delay with a maximum value corresponding to a storage capacity of said mass memory disc means and a granularity of the delay that is orders of magnitude lower than said maximum value, the storage capacity of said single bridging buffer corresponding to a fraction of the storage capacity of said mass memory disc means, wherein the storage capacity of said mass memory disc means allows a delay of the sequential video signal elements in said mass memory disc means in the order of several minutes or more, a granularity of the delay in said mass memory disc means being less than the storage capacity of the single bridging buffer, while the storage capacity of said single bridging buffer allows a delay of the sequential video signal elements in said single bridging buffer of, at most, a few seconds, whereby the arrangement allows simultaneous inputting and outputting of the sequential video signal elements, each at an average speed that corresponds to a standard receiving or displaying speed, respectively.

2. An arrangement as claimed in claim 1, as used in a television receiver apparatus that has a video output for connection to a video recorder apparatus.

3. An arrangement as claimed in claim 1, wherein said write head means and said read head means are located in a single head.

4. An arrangement as claimed in claim 1, wherein said mass memory disc means are magnetic or optical storage hard disc means.

5. An arrangement as claimed in claim 1, wherein said input means are arranged for operating at a first average speed and said output means are arranged for then operating at a second average speed that is fractionally higher than said first average speed.

6. An arrangement as claimed in claim 5, wherein said second average speed corresponds to an appropriate human user viewing speed.

7. An arrangement as claimed in claim 1, wherein said input means are arranged for operating at a first average speed and said output means are arranged for selectably operating at a second average speed that is either controllably fractionally higher or controllably fractionally lower than said first average speed.

8. An arrangement as claimed in claim 7, wherein said second average speed corresponds to an appropriate human user viewing speed.

9. An arrangement as claimed in claim 1, wherein said mass memory disc means allow current storage of at least a five minute long stream of video signal elements.

10. An arrangement as claimed in claim 1, wherein said input means, said output means and said mass memory disc means are arranged for accepting at least two independent streams of video signal elements in parallel.

11. An arrangement as claimed in claim 1, wherein said input means and said mass memory disc means are arranged for accepting at least two independent streams of video signal elements in parallel.

12. An arrangement as claimed in claim 1, for use with a supplementary video recording apparatus, wherein said output means are arranged for retrospectively presenting a video signal to said video recording apparatus after said intermediate storage having commenced at an earlier instant.

13. An arrangement as claimed in claim 1, for use with a video receiver apparatus and a video display apparatus, and being arranged for broadcaster-independent replay and/or slow-motion replay.

14. An arrangement as claimed in claim 1, for use with a multi-channel video-receiver apparatus and a supplementary single-channel video-recording apparatus, wherein said input means and said mass memory disc means are arranged for accepting at least two independent streams of video signal elements in parallel and said output means are arranged for retrospectively presenting a video signal to said supplementary single-channel video-recording apparatus with respect to a second channel after said intermediate storage having commenced at an earlier instant during overlap of said second channel with a first channel during the latter's being stored on said supplementary single-channel video-recording apparatus.

15. An arrangement as claimed in claim 1, for use with a video-receiver apparatus and a video display apparatus, wherein said input means and said mass memory disc means are arranged for accepting a first stream of video signal elements in parallel to receiving at least a second independent stream of video signal elements next to said first stream of video signal elements by said video receiver apparatus, and said output means are arranged for retrospectively presenting a video signal to said video display apparatus with respect to said first stream after said intermediate storage having commenced at an earlier instant during overlap of said first and second streams, and said second stream's being displayed on said video display apparatus.

16. An arrangement as claimed in claim 1, for use with a video-receiver apparatus and a video display apparatus, and for receiving a stream of video signal elements, and comprising inputting means for receiving an intermission control signal at a first particular time instant, and second inputting means for subsequently receiving a continue control signal at a second particular time instant, and said output means are arranged for retrospectively presenting a video signal to said video display apparatus as from said second particular time instant on for displaying said stream of video signal elements as having been stored since said first particular time instant.

\* \* \* \* \*